United States Patent [19]
Bell et al.

[11] 3,946,930
[45] Mar. 30, 1976

[54] APPARATUS FOR JET SOLDERING CONTAINERS

[75] Inventors: George Bell, Radlett; David G. Rance, Boreham Wood; Sydney Raxworthy, Potters Bar, all of England

[73] Assignee: Metal Box Limited, Reading, England

[22] Filed: Sept. 30, 1974

[21] Appl. No.: 510,714

[30] Foreign Application Priority Data
Oct. 9, 1973 United Kingdom............... 47151/73

[52] U.S. Cl..................... 228/41; 228/11; 113/1 M
[51] Int. Cl.[2]......................................... B23K 1/16
[58] Field of Search............ 113/1 M, 8; 228/10, 11, 228/41, 53

[56] References Cited
UNITED STATES PATENTS

| | | | |
|---|---|---|---|
| 1,623,293 | 4/1927 | Williams et al.................... | 228/41 X |
| 3,003,049 | 10/1961 | Thomas ................................ | 228/53 |
| 3,707,258 | 12/1972 | Schlitt................................ | 228/41 X |
| 3,797,725 | 3/1974 | Mori et al............................. | 228/41 |
| 3,852,565 | 12/1974 | Kager................................. | 228/53 X |

Primary Examiner—Al Lawrence Smith
Assistant Examiner—James G. Smith
Attorney, Agent, or Firm—Diller, Brown, Ramik & Wight

[57] ABSTRACT

This disclosure relates to a jet soldering apparatus for applying a jet of solder to a side seam of a can body formed in a bodymaker. The soldering apparatus includes a heated metal block having an elongated cavity which terminates in a discharge orifice. Solder wire is fed into the cavity and is heated therein by means of electrical heaters connected to the block. The cavity has an inlet in the form of a bore which substantially corresponds to the diameter of the solder wire so that the solder wire prevents any back flow of molten solder through the inlet. The cavity is also in the form of a bore generally conforming to the diameter of the solder wire and is of a length to make certain that the solder wire is fully melted before it reaches the discharge orifice. Feed means are provided to intermittently feed the solder wire in accordance with the presentation of a can body to the discharge orifice. The feed means include a reciprocating chuck and a staionary chuck which act in unison. The reciprocating chuck is driven by a cam actuated by the drive system of the bodymaker. Further, there is incorporated in the system means for moving the reciprocating chuck out of the effective range of the cam so that the solder feeding mechanism may be selectively rendered inoperative.

4 Claims, 5 Drawing Figures

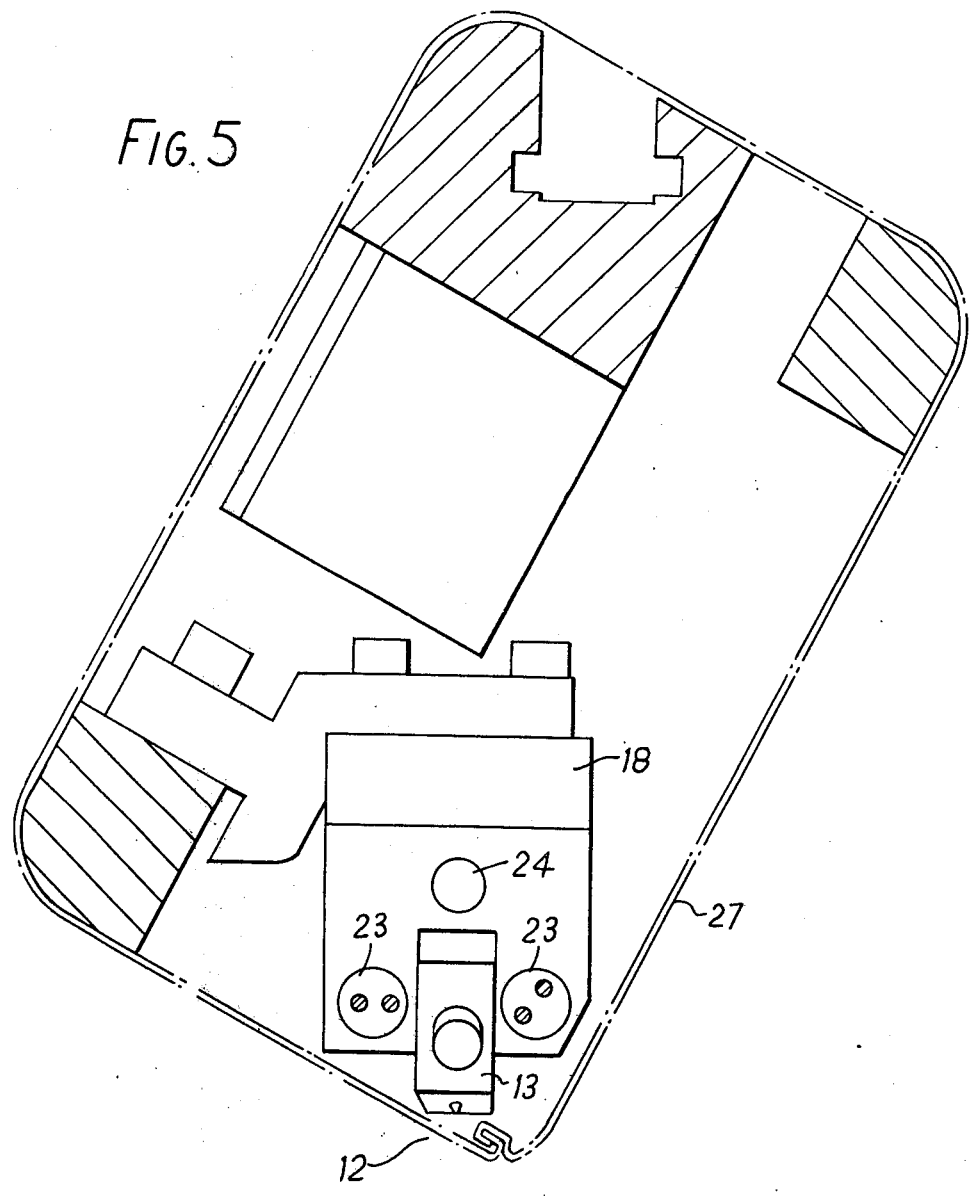

APPARATUS FOR JET SOLDERING CONTAINERS

This invention relates to the soldering of seams of metal containers such as cans by means of a jet of molten solder.

In existing methods of jet soldering, a reservoir of molten solder is used to provide a pressure head to force the solder through a jet orifice. Constancy in the jet flow rate is obtained by maintaining close control of the level of the solder in the reservoir and devices are used in ensure this condition.

Further, because during can-making the flow of solder from the jet is uninterrupted, a special side seamer conveying can bodies at a close separation is employed to avoid wastage of solder. The need for this type of side seamer adds considerably to the costs of converting existing lines to the jet process, because the side seamers on these lines convey the can bodies at a wide separation.

The invention provides a new method of producing the solder jet which method eliminates the need to have a reservoir of molten solder, with its attendant level control, and makes possible jet application to can bodies on existing side-seaming equipment irrespective of their separation, by interrupting the issue of solder as required so that it is only jetted when there is a seam to receive it.

According to a feature of the invention, a method and apparatus for soldering seams of metal containers are provided wherein solder is melted as it is required by feeding, at a controlled rate, a solder wire into a cylindrical cavity in a heated block of metal. This cavity, having a bore to match the diameter of the wire, terminates in an orifice which forms the jet of solder, and the length of the cavity is sufficient to allow a residence time long enough to ensure complete melting of the wire at the rate at which it is required to be fed. The flow of solder from the jet orifice responds to the feeding of solder wire into the cavity.

The invention is applicable to both internal and external soldering of container seams.

One embodiment of the invention will now be described, by way of example and with reference to the accompanying drawings of which:

FIG. 5 is an end elevational view of the melting block shown in FIG. 4 in conjunction with can body guide means.

Figure 1:
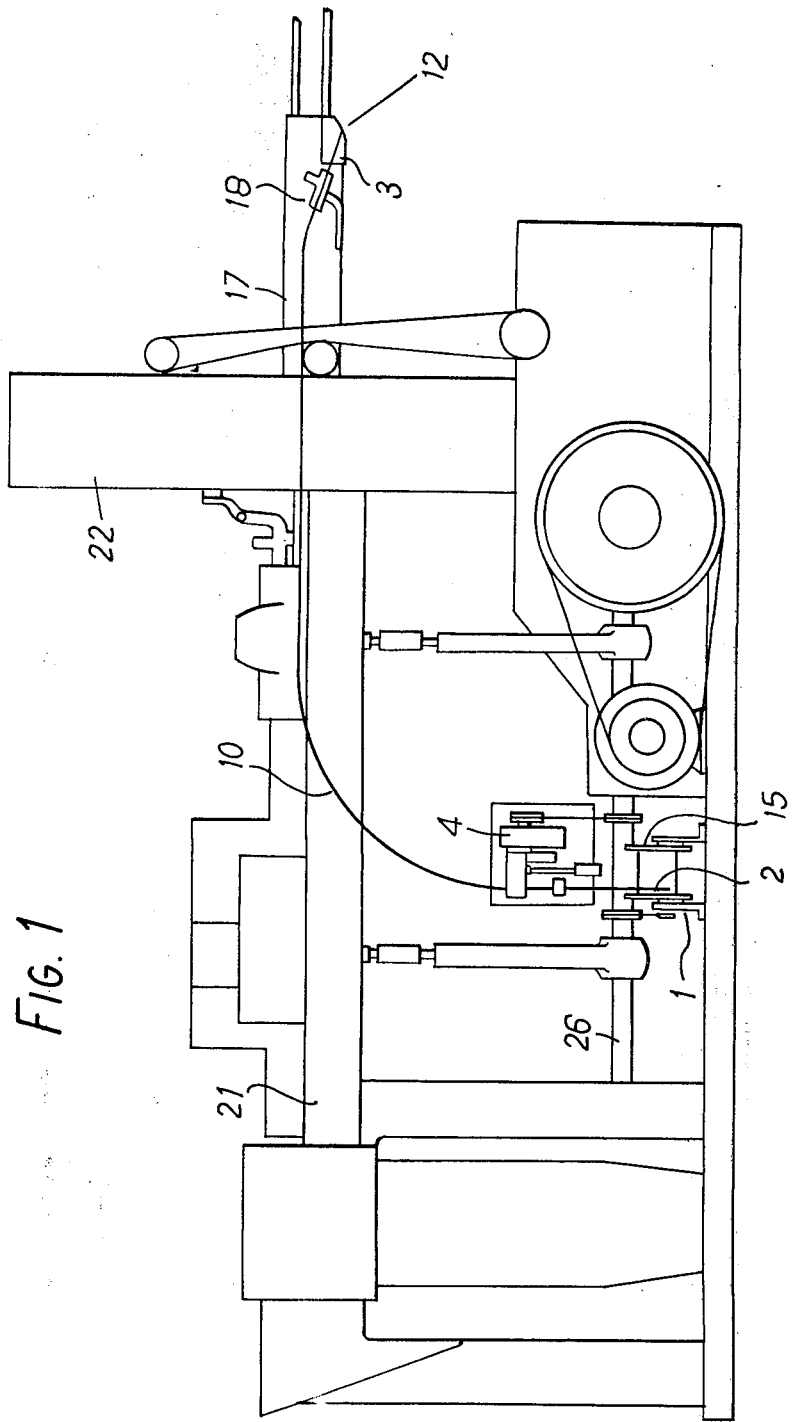
FIG. 1 is a diagrammatic side elevational view of a can bodymaker showing the path of a solder wire feed for internal jet soldering of side seams of a succession of can bodies.

Referring to FIG. 1, the general arrangement of the bodymaker, which is largely of conventional construction, is such as to allow the mounting of an intermittent solder feed 1 delivering a solder wire 2 to a solder melting block 3. The solder wire 2 is drawn from a supply spool 15, which is mounted on a reel spindle (not shown), by a gripping mechanism 4 which includes a carriage 5 and a chuck 6, as shown in FIG. 2.

A cam 7, driven from the bodymaker main drive shaft 26, and therefore synchronised with the remainder of the machine, moves the carriage 5 back and forth against the resistance of a spring 8, and, in turn, feeds the solder wire in synchronism with the motion of bodies formed by the bodymaker. The can bodies, in the areas of the side seams thereof are fluxed in a conventional manner as they progress to be soldered along a conventional sub-horn assembly 17. The lift or stroke of the cam 7 and its shape determine the length of solder wire to be fed and the timing of the starting and stopping of the jet of solder which is produced in a manner to be described below. In this way the solder flow is controlled for each can body in respect of overall quantity and in relation to the length of each can body.

Figure 2:
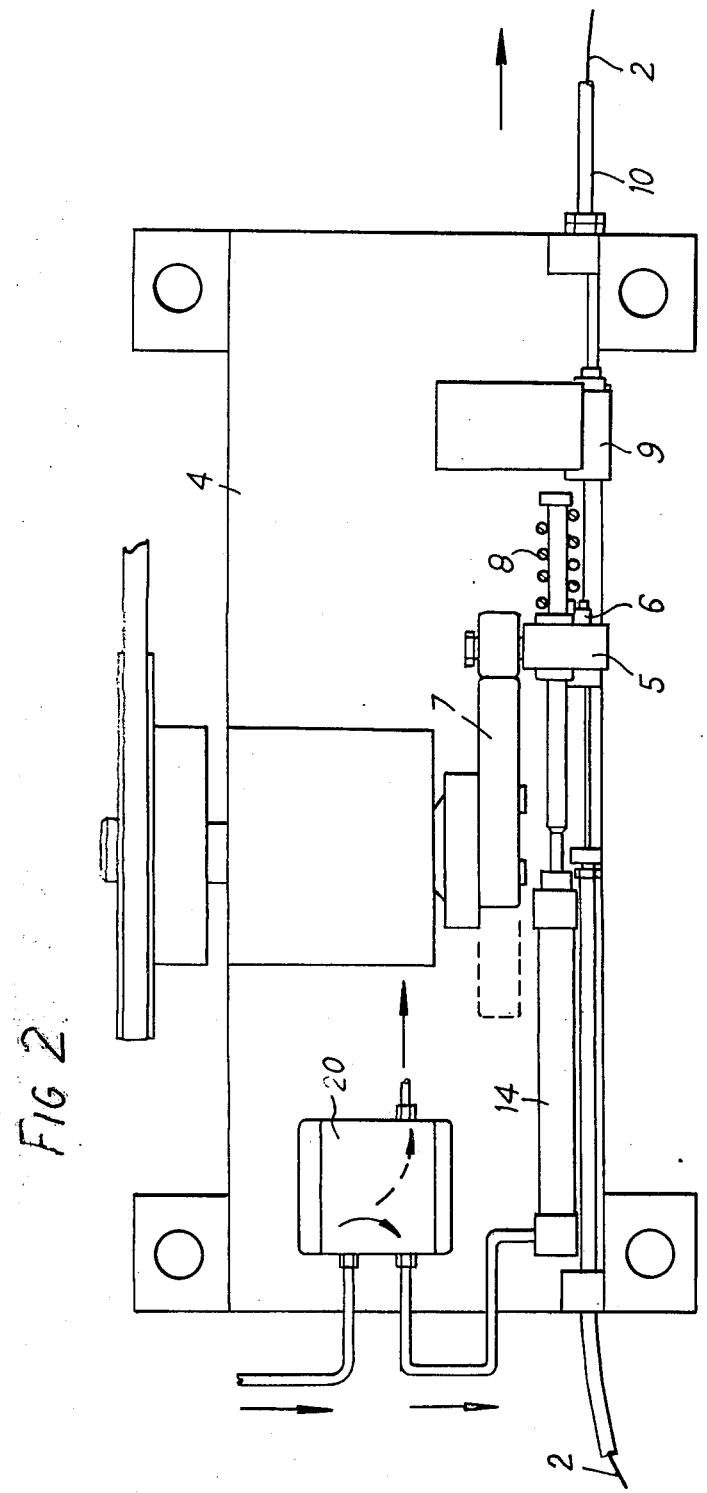
FIG. 2 is a diagrammatic plan view of a solder wire gripping and advancing means forming part of the bodymaker.
Figure 3:
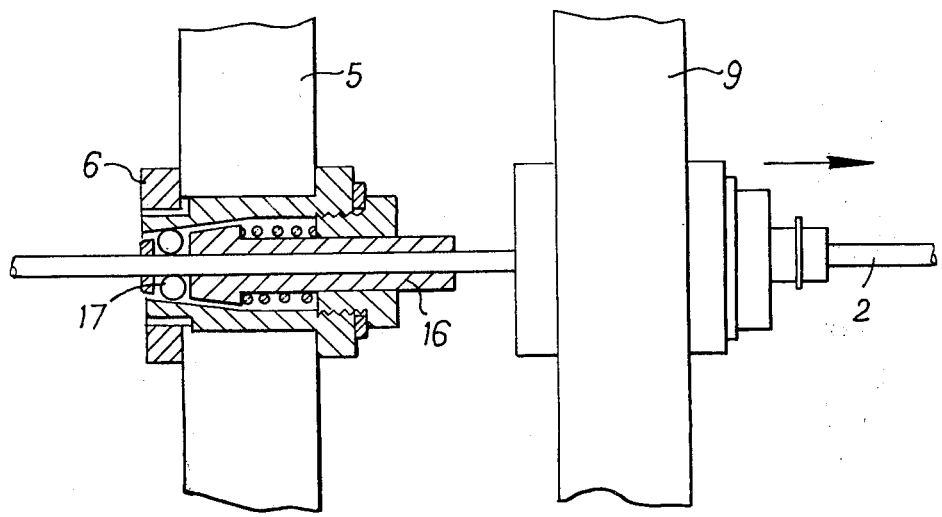
FIG. 3 is a fragmentary elevational view on an enlarged scale with parts in section and shows details of a moving chuck and stationary chuck, also part of the bodymaker.

Still referring to FIG. 2, it will be seen that the return stroke of the carriage 5 is brought about by the spring 8 or a plurality of such springs. A stationary chuck 9 holds the solder wire 2 to allow the disengagement of chuck 6 on its return stroke. FIG. 3 includes a detailed section of the moving chuck 6.

Figure 4:
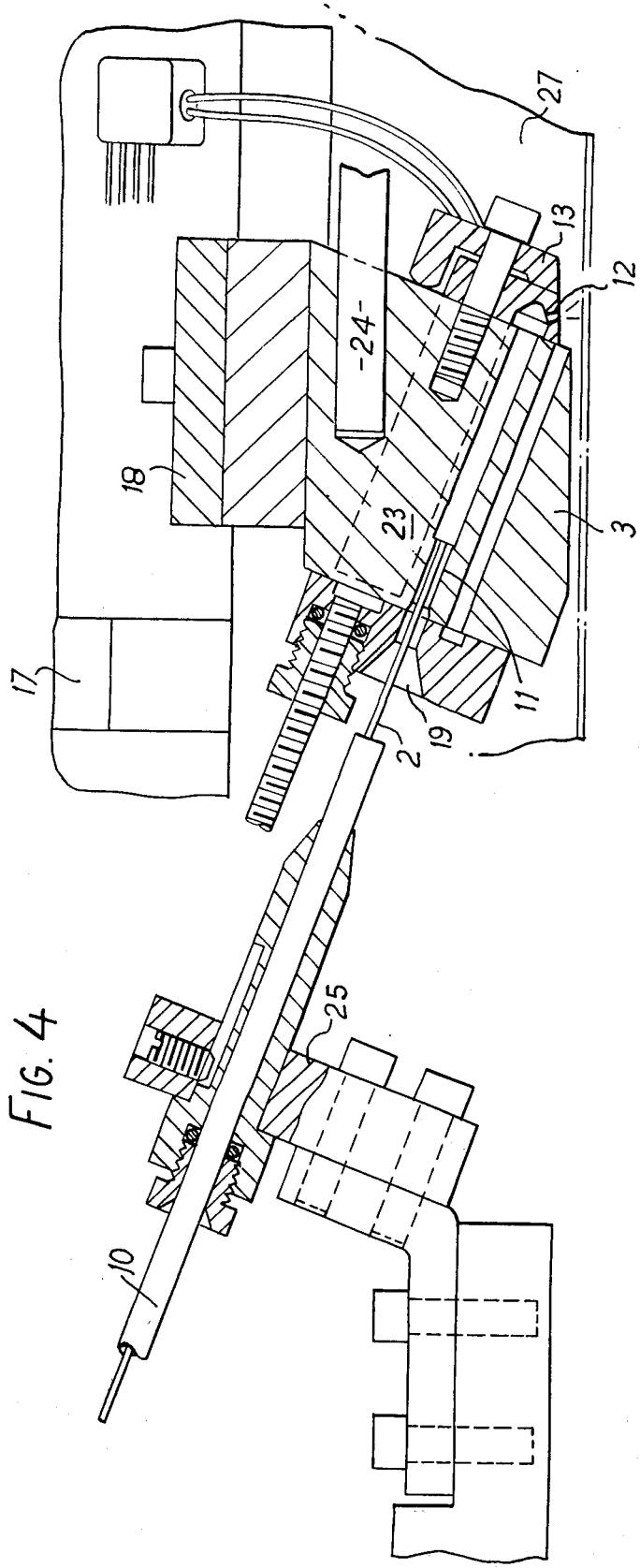
FIG. 4 is a diagrammatic elevational view with parts in section of a feed tube and solder melting block of the bodymaker.

Referring to FIG. 4, it will be seen that there is attached to and forming part of the sub-horn assembly 17 is a solder horn assembly 18 which includes the solder melting block 3. The solder melting block 3 is an electrically heated assembly to which the solder wire 2 is delivered via a feed tube 10 which is preferably formed of polymeric material. The forward motion of the wire in conjunction with its melting in the cylindrical cavity 11, maintains the pressure to cause the molten solder to issue as a jet from the orifice 12, which is held in contact with block 3 by a clamp 13. Back flow of molten solder from the block is obviated by the chilling effect of the solder wire at an entry point 19 into the block 3, in combination with a small positive dimensional difference between the bore of the cylindrical cavity 11 and the diameter of the solder wire 2.

An air cylinder 14, controlled by a solenoid valve 20, is used to hold the carriage 5 at the extreme limit of the cam 7 to permit the bodymaker to operate without at the same time feeding solder wire.

In operation, can bodies 27 are formed from blanks, approaching along the deck 21 of the bodymaker from left to right (FIG. 1), in a forming unit 22 of conventional construction, whence they proceed along the sub-horn assembly 17 guided by conveyor means (not shown) of conventional type. At this stage the edges of the body which form a side seam are arranged in close relationship ready for soldering. The can bodies pass around the solder horn assembly 18 in succession and in spaced relationship, molten solder being jetted internally on to the side seam by the nozzle 12 while the side seam is passing below it.

The intermittent feeding of the solder wire 2 by the solder feed 1 from the reel may be motivated by the motion of the gripper 6 but if fragile solder wires are to be used, then the reel spindle may be driven from a bodymaker drive shaft 26 as shown in FIG. 1. The reel spindle and support brackets may be mounted upon a bed-plate of the bodymaker or in any other position on a frame of the bodymaker which will allow the solder to travel, without sharp bending, into the solder delivery tube for carrying it to the gripping mechanism 4.

The gripping mechanism 4 uses two forms of motivation. The system used when a can is presented to the soldering nozzle 12 is that the cam 7 pushes the carriage 5 and attached chuck 6 forward to pull enough solder wire for one can from reel 15. When a body blank detector signals that no can is to be presented to the soldering head 3, a solenoid operated valve 20 operated by the bodymaker vacuum supply (not shown), directs air to cylinder 14 pushing the carriage 5 and holding it at the maximum travel, thus preventing the carriage 5 and chuck 6 returning to feed more solder. Holding the carriage at maximum stroke allows the cam 7 to rotate without feeding solder wire. When the vacuum supply is restored, signalling that a can will be presented to the solder head, the valve 20 exhausts the cylinder 14 which is returned to its inoperative position by a spring 8, allowing the carriage 5 to return to the operating position automatically retiming at the correct position in the cycle.

It will be understood that the sequence consists of a cycle-chuck 6 grips and travels forward carrying the solder in the direction of the arrow (see right of FIG. 2) freely through fixed chuck 9. At the end of the stroke the jaws 16 (FIG. 3) of chuck 6 relax the grip of balls 28 and allowing the return stroke of the carriage without damage to the solder wire during which return stroke the fixed chuck 9 holds the wire 2.

Throughout the bodymaker the solder is conducted through tubing which forms parts of the feed tube 10.

In FIG. 4 there is shown how the tube 10 is led to a locating bracket 25 from which the solder wire 2 emerges to enter the solder melting block 3 through the entry 19. Upon entry into the melting block 3, the solder wire is pushed into the heated tube 11 where melting takes place under the influence of electrical heaters generally indicated at 23. Thermal control of the temperature of solder melting block is by means of thermocouple 24. Upon melting the molten solder is held in the region between the heated tube 11 and the jet 12 until such time as the controlled feed of solder wire displaces the molten solder through jet 12 onto a can side seam. The jet block 12 is held by a clamp 13 so that it is easily removable for cleaning or replacement.

The invention is applicable to can bodies of any cross-section, for example, rectangular or cylindrical, the bodymaker, and more particularly the sub-horn and solder horn assemblies, being arranged accordingly to suit the can body cross-section. When the invention is used for external soldering the solder path and feed mechanism may be totally external from the bodymaker. By arranging the components shown in FIG. 4 suitably, externally of the path of the side seams along the bodymaker, the invention may be used for external jet soldering of the side seams.

When necessary the soldering operation may be aided by the temperature of the side seam of the can body being suitably raised to cause the solder to flow. The heat for this purpose may be provided either before or after the application of solder to the can body or as a combination of both.

The invention is versatile in that it may be used on existing bodymakers and side seamers having the wide-spaced can body delivery or it can be used for more closely spaced can body deliveries, in which case it may be convenient to simply deliver a continuous jet of solder.

The invention provides a system which reduces the risk of blockages in the solder delivery arising from oxidation.

It will be understood that rapid starting of the machine is possible because of the low thermal capacity of the heating block 3.

Although only a preferred embodiment of the jet soldering apparatus and the utilization thereof have been illustrated and described herein, it is to be understood that minor variations may be made in the soldering apparatus and its utilization without departing from the spirit and scope of this invention as defined by the appended claims.

We claim:

1. An apparatus for jet soldering, said apparatus comprising a heater having an elongated cavity defined by a wall, said heater also having heating means for heating said cavity wall to a temperature to effect melting of solder, said cavity having an inlet and a discharge, said discharge being in the form of discharge orifice means for forming a jet of solder, feed means for feeding solder in the form of wire, said inlet including a bore generally matching the diameter of the intended solder wire, and said means for feeding solder forming means for effecting the discharge of a solder jet from said discharge orifice, said feed means being an intermittent feed means and including a reciprocating chuck, and said reciprocating chuck having cam actuated drive means.

2. The apparatus of claim 1 together with control means for rendering said feed means inoperative, said control means including a shifting mechanism for holding said reciprocating chuck in an advanced position wherein said cam actuated drive means are rendered inoperative.

3. The apparatus of claim 1 wherein said apparatus is part of a bodymaker for forming can bodies having side seams which are to be soldered, said bodymaker having a drive system, and drive means interconnect said drive system with said cam actuated drive means for actuating said feed means in timed relation with the movement of a can body to effect the jet flowing of solder only when a can body is in alignment with a flowing solder jet.

4. An apparatus for jet soldering, said apparatus comprising a heater having an elongated cavity defined by a wall, said heater also having heating means for heating said cavity wall to a temperature to effect melting of solder, said cavity having an inlet and a discharge, said discharge being in the form of discharge orifice means for forming a jet of solder, feed means for feeding solder in the form of wire, said inlet including a bore generally matching the diameter of the intended solder wire, and said means for feeding solder forming means for effecting the discharge of a solder jet from said discharge orifice, said apparatus being part of a bodymaker for forming can bodies having side seams which are to be soldered, said bodymaker having a drive system, and drive means interconnect said drive system with said feed means for actuating said feed means in timed relation with the movement of a can body to effect the jet flowing of solder only when a can body is in alignment with a flowing solder jet.

* * * * *